United States Patent
Zheng

(10) Patent No.: US 8,381,013 B2
(45) Date of Patent: Feb. 19, 2013

(54) METHOD AND APPARATUS FOR DETECTING AND HANDLING PEER FAULTS IN PEER-TO-PEER NETWORK

(75) Inventor: Hewen Zheng, Shenzhen (CM)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 12/765,628

(22) Filed: Apr. 22, 2010

(65) Prior Publication Data

US 2010/0205481 A1    Aug. 12, 2010

Related U.S. Application Data

(63) Continuation of application No. PCT/CN2008/072760, filed on Oct. 21, 2008.

(30) Foreign Application Priority Data

Oct. 26, 2007    (CN) .......................... 2007 1 0165511

(51) Int. Cl.
*G06F 11/00*    (2006.01)

(52) U.S. Cl. .................. 714/4.1; 714/25; 714/48; 714/2

(58) Field of Classification Search .................... 714/4.1, 714/25, 48

See application file for complete search history.

(56) References Cited

U.S. PATENT DOCUMENTS

| | | | |
|---|---|---|---|
| 6,574,753 B1 * | 6/2003 | Haynes et al. ................... | 714/43 |
| 7,454,494 B1 * | 11/2008 | Hedayat et al. ................ | 709/224 |
| 2003/0018930 A1 * | 1/2003 | Mora et al. ....................... | 714/42 |
| 2003/0196148 A1 | 10/2003 | Harrisville-Wolff et al. | |
| 2004/0165537 A1 * | 8/2004 | Lee et al. ...................... | 370/252 |
| 2007/0230482 A1 | 10/2007 | Shim et al. | |
| 2009/0217096 A1 * | 8/2009 | Ing et al. ......................... | 714/37 |

FOREIGN PATENT DOCUMENTS

| | | |
|---|---|---|
| CN | 1541466 A | 10/2004 |
| CN | 1592225 A | 3/2005 |
| JP | 2231835 A | 9/1990 |
| JP | 2002374302 A | 12/2002 |
| KR | 20060062015 A | 6/2006 |
| WO | 2007074539 A1 | 7/2007 |

OTHER PUBLICATIONS

K. Kompella et al.: "Detecting Multi-Protocol Label Switched (MPLS) Data Plane Failures," IETF Standard, Internet Engineering Task Force, IETF, CH, XP015044811, Feb., 2006, 50 pages.
D. Bryan et al.: "Concepts and Terminology for Peer to Peer SIP," Jun. 2007, 23 pages.
M. Matuszewski et al.: "Security requirements in P2PSIP," Jul. 9, 2007, 15 pages.
J. Postel: "Internet Control Message Protocol," Sep. 1981, 17 pages.
D. Mills: "Simple Network Time Protocol (SNTP) Version 4 for IPv4, IPv6 and OSI," Oct. 1996, 14 pages. European search report issued in corresponding European patent application No. 08842239.9, Sep. 1, 2010, 10 pages.
English translation of the written opinion issued in corresponding PCT application No. PCT/CN2008/072760, Dec. 4, 2008, 4 pages.

* cited by examiner

*Primary Examiner* — Scott Baderman

(57) ABSTRACT

A method and apparatus for detecting and handling peer faults in a Peer-to-Peer network are disclosed. A peer in the P2P network receives a diagnosis request message; then detects whether a peer is faulty according to a preset fault detection method; and sends a diagnosis response message to a source peer that constructs the diagnosis request message or a peer specified by the diagnosis request message, where the diagnosis response message carries a detection result, and the detection result carries information about the faulty peer if the peer is detected as faulty. Through the technical solution under the present invention, the faults of the peers on the forwarding path in the P2P network can be detected.

18 Claims, 9 Drawing Sheets

METHOD AND APPARATUS FOR DETECTING AND HANDLING PEER FAULTS IN PEER-TO-PEER NETWORK

CROSS-REFERENCE TO RELATED APPLICATIONS

This application is a continuation of International Application No. PCT/CN2008/072760, filed on Oct. 21, 2008, which claims priority to Chinese Patent Application No. 200710165511.9, filed on Oct. 26, 2007, both of which are hereby incorporated by reference in their entireties.

FIELD OF THE INVENTION

The present invention relates to network and communication technologies, and in particular, to a method and apparatus for detecting and handling peer faults in a Peer-to-Peer (P2P) network.

BACKGROUND OF THE INVENTION

A P2P network is made up of multiple interconnected nodes which are known as peers. In a P2P network, each peer contributes its capabilities, and all the peers work together to provide P2P network services. Currently, the P2P network services include distributed storage services and distributed transmission services. Unlike the nodes in a traditional client/server architecture, all nodes in a P2P network are peers, and the peers that make up the P2P network provide services in distributed mode. The peers that make up the P2P network have a unique identifier called "peer-ID" in the P2P network. The resources stored in the P2P network through the distributed storage services have their independent identifier called "resource-ID" in the P2P network. The P2P network uses the identifiers (namely, peer-IDs and resource-IDs) for routing. When deciding the route of forwarding, a peer in the P2P network selects a peer in its P2P network routing table, and uses the selected peer as the next hop of the P2P network route, where the selected peer has a peer-ID which is closer to the destination ID. Currently, three P2P network routing modes (also known as forwarding modes) are available: iterative mode, recursive mode, and semi-recursive mode. The iterative mode differs from the recursive mode and the semi-recursive mode in that: In iterative mode, the intermediate peer does not forward packets, but notifies the found next hop to the source peer, and then the source peer communicates with the next hop. This process is repeated until the packets arrive at the destination peer. In recursive or semi-recursive mode, however, each intermediate peer forwards the packets to the found next hop directly, and repeats forwarding until the packets arrive at the destination peer. In recursive mode, the reply message is returned by the destination peer along the forwarding path to an upstream peer until the source peer, and the reply message is forwarded through intermediate peers. In semi-recursive mode, the reply message is sent by the destination peer to the source peer directly, without being forwarded by the intermediate peers.

The P2P network is characterized by self organization and self management. The peers in the P2P network can join and leave the P2P network freely, which makes the P2P network highly extensible. Meanwhile, in the P2P network, multiple peers work together to provide services, thus avoiding single-point failure in the traditional client/server architecture. Although the fault of a peer does not affect all peers in the P2P network, the fault makes some peers unable to obtain P2P network services, namely, leads to deterioration of the Quality of Service (QoS) of the P2P network or even service interruption within a period. The distributed feature of the P2P network makes it hard to detect or handle the faults (such as peer failure, peer congestion, and forwarding error) on the forwarding path. Although the maintenance and management system of the existing P2P network can detect and locate the join and leave of the peers, no corresponding mechanism is available for detecting and handling the faults of the peers, which affects the P2P network services.

SUMMARY OF THE INVENTION

Embodiments of the present invention provide a method and apparatus for detecting and handling faults of peers on a forwarding path in a P2P network to improve the reliability and efficiency of data transmission in the P2P network.

A method for detecting peer faults in an embodiment of the present invention includes:
  receiving a diagnosis request message;
  detecting whether a peer is faulty according to a preset fault detection rule;
  sending a diagnosis response message to a source peer that constructs the diagnosis request message or a peer specified by the diagnosis request message, wherein: the diagnosis response message carries a detection result, and the detection result carries information about the faulty peer if the peer is detected as faulty.

A method for handling peer faults in an embodiment of the present invention includes:
  receiving a diagnosis response message;
  determining a faulty peer according to the diagnosis response message;
  constructing a packet to be sent; adding information about the faulty peer to the packet, and instructing intermediate peers to bypass the faulty peer in the process of forwarding the packet; and
  sending the packet.

An apparatus for detecting peer faults in an embodiment of the present invention includes:
  a message receiving unit, adapted to receive a diagnosis request message;
  a fault detecting unit, adapted to check whether a peer is faulty according to a preset fault detection rule;
  a sending unit, adapted to send a diagnosis response message to a source peer that constructs the diagnosis request message or a peer specified by the diagnosis request message, where: the diagnosis response message carries a detection result, and the detection result carries information about the faulty peer if the peer is detected as faulty.

An apparatus for handling peer faults in an embodiment of the present invention includes:
  a receiving unit, adapted to receive a diagnosis response message;
  a peer identifying unit, adapted to determine a faulty peer according to the diagnosis response message;
  a packet constructing unit, adapted to: construct a packet to be sent, add information about the faulty peer to the packet, and instruct intermediate peers to bypass the faulty peer in the process of forwarding the packet; and
  a packet sending unit, adapted to send the packet.

As seen from the technical solution under the present invention, a diagnosis request message triggers the peer to detect the fault state of this peer, thus providing a path fault detection mechanism for the P2P network; after detecting a fault, the peer sends the detection result to the corresponding peer such as the source peer so that the source peer knows whether the forwarding path is smooth and decides whether to send the packet; further, the returned detection result carries information about the faulty peer, and therefore, the source peer can locate the faulty peer and bypass it when sending the packet, thus improving the reliability and efficiency of data transmission in the P2P network.

DETAILED DESCRIPTION OF THE INVENTION

To make the technical solution, objectives and merits of the present invention clearer, the following describes the embodiments of the present invention in detail with reference to accompanying drawings.

Figure 1:
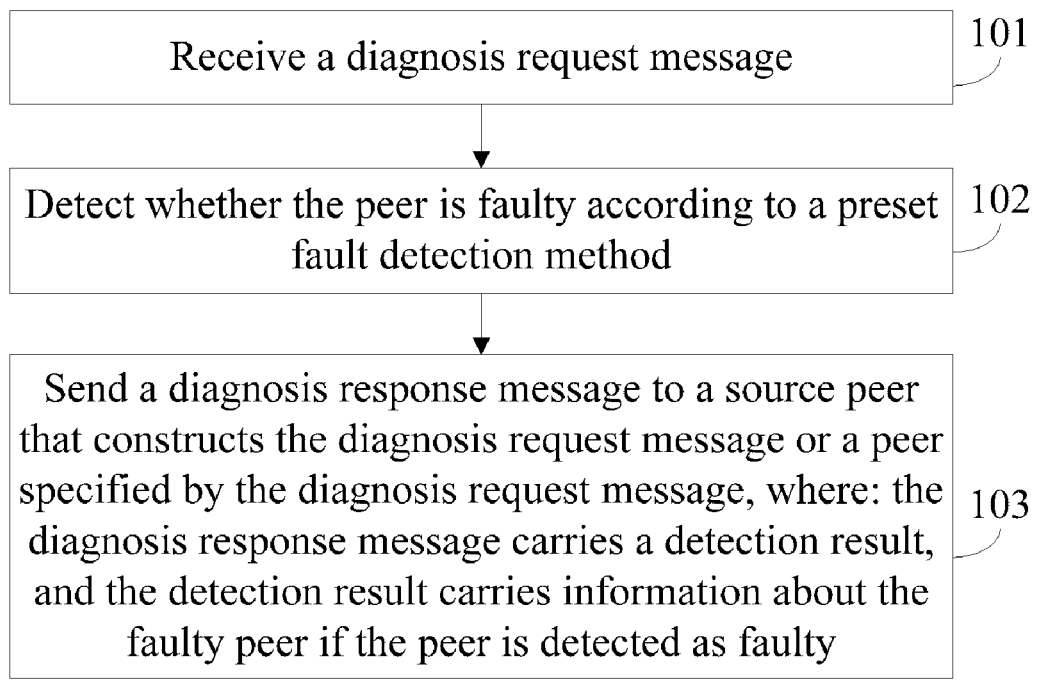
FIG. 1 is a flowchart of a method for detecting peer faults in a first embodiment of the present invention.

A method for detecting peer faults is provided in the first embodiment of the present invention. As shown in FIG. 1, the method includes:

Step 101: Receive a diagnosis request message.

The diagnosis request message may directly come from the source peer that needs to detect the peer fault, or come from an upstream peer on the forwarding path.

Step 102: Detect whether the peer is faulty according to the preset fault detection rule, namely, detect whether the peer can provide P2P network services normally.

Specifically, the detection may be performed by checking the resource utilization of the processor or the network bandwidth utilization of this peer, and the check items include the peer congestion or busy processing state. The congested or busy state is determined if the check items reach or exceed the preset threshold. The threshold may be set according to the use environment or the processing efficiency of this peer.

The upstream peer may be checked for faults, such as diagnosis request forwarding errors. Specifically, the upstream peer ID may be compared with the destination ID of the diagnosis request message. If the upstream peer ID is closer to the destination ID of the diagnosis request message, it is deemed that the upstream node forwards the diagnosis request message incorrectly. A downstream peer may be checked for faults. If the downstream peer is unreachable, a standard protocol message may be used to determine the fault of the downstream peer. For example, a message that requires response may be sent to the downstream peer. If no response is received, it is determined that the downstream peer is faulty.

Step 103: Send a diagnosis response message to a source peer that constructs the diagnosis request message or a peer specified by the diagnosis request message, where: the diagnosis response message carries a detection result, and the detection result carries information about the faulty peer if the peer is detected as faulty.

Generally, the diagnosis response message is sent in preset sending mode. However, if the diagnosis request message specifies a sending mode, the diagnosis response message needs to be sent in specified sending mode.

Generally, the diagnosis response message is sent to the source peer that constructs the diagnosis request message. However, if the diagnosis request message specifies a peer that receives the diagnosis response message, the diagnosis response message needs to be sent to the specified peer.

The information about the faulty peer in the detection result may let the peer that receives the diagnosis response message locate the faulty peer.

Preferably, the diagnosis response message may carry information about the fault type. The peer that receives the diagnosis response message may be a source peer that constructs the diagnosis request message, or a peer specified by the diagnosis request message.

In conclusion, in the embodiments of the present invention, a diagnosis request message triggers the peer to detect the fault state of this peer, thus providing a fault detection mechanism for the P2P network; after detecting a fault, the peer sends the detection result to the corresponding peer such as the source peer so that the source peer knows whether the forwarding path is smooth and decides whether to send the packet; further, the returned detection result carries information about the faulty peer, and therefore, the source peer can locate the faulty peer and bypass it when sending the packet, thus improving the reliability and efficiency of data transmission in the P2P network.

At the time of receiving the diagnosis request message, the time of receiving the diagnosis request message is recorded, and the time of receiving the diagnosis request message is sent to the source peer that constructs the diagnosis request message or the peer specified by the diagnosis request message; all the peers on the forwarding path send the time of receiving the diagnosis request message to the source peer that constructs the diagnosis request message or the peer specified by the diagnosis request message, and therefore, the source peer that constructs the diagnosis request message or the peer specified by the diagnosis request message knows the time spent in transmitting the diagnosis request message between the two peers, determines the delay of transmitting the diagnosis request message between the two peers according to the preset rule, and judges whether the forwarding path is faulty (for example, congested). The time of receiving the diagnosis request message may be carried in the diagnosis response message, or carried in other messages, or sent separately. The embodiments of the present invention do not limit how to send the time of receiving the diagnosis request message.

In practice, before checking whether the peer is faulty according to the preset fault detection method, the method further includes the following step:

judging whether the diagnosis request message is valid; and, if the diagnosis request message is valid, check whether the peer is faulty according to the preset fault detection method. The validity of the diagnosis request message may be judged according to the protocol that governs the diagnosis request message. For example, if the applied protocol is P2P SIP Peer, it is only necessary to judge whether the diagnosis request message complies with the P2P SIP Peer protocol; moreover, the validity of the diagnosis request message may be judged according to the pre-appointed security mechanism, for example, through check codes.

Moreover, if the diagnosis request message carries the validity period of the diagnosis request message in the network, for example, carries Time To Live (TTL) measured by hop count or TTL measured by time, a judgment may be made about whether the validity period of the diagnosis request message in the network expires. If the validity period has not expired, the diagnosis request message is valid. After the diagnosis request message is determined as valid, the process goes on. If the diagnosis request message is determined as invalid, the diagnosis request message may be discarded, and the information about expiry of the diagnosis request message may be sent to the corresponding peer such as the source peer, or no operation is performed. The embodiments of the present invention do not limit the operations to be performed after the diagnosis request message is determined as invalid.

Figure 2:
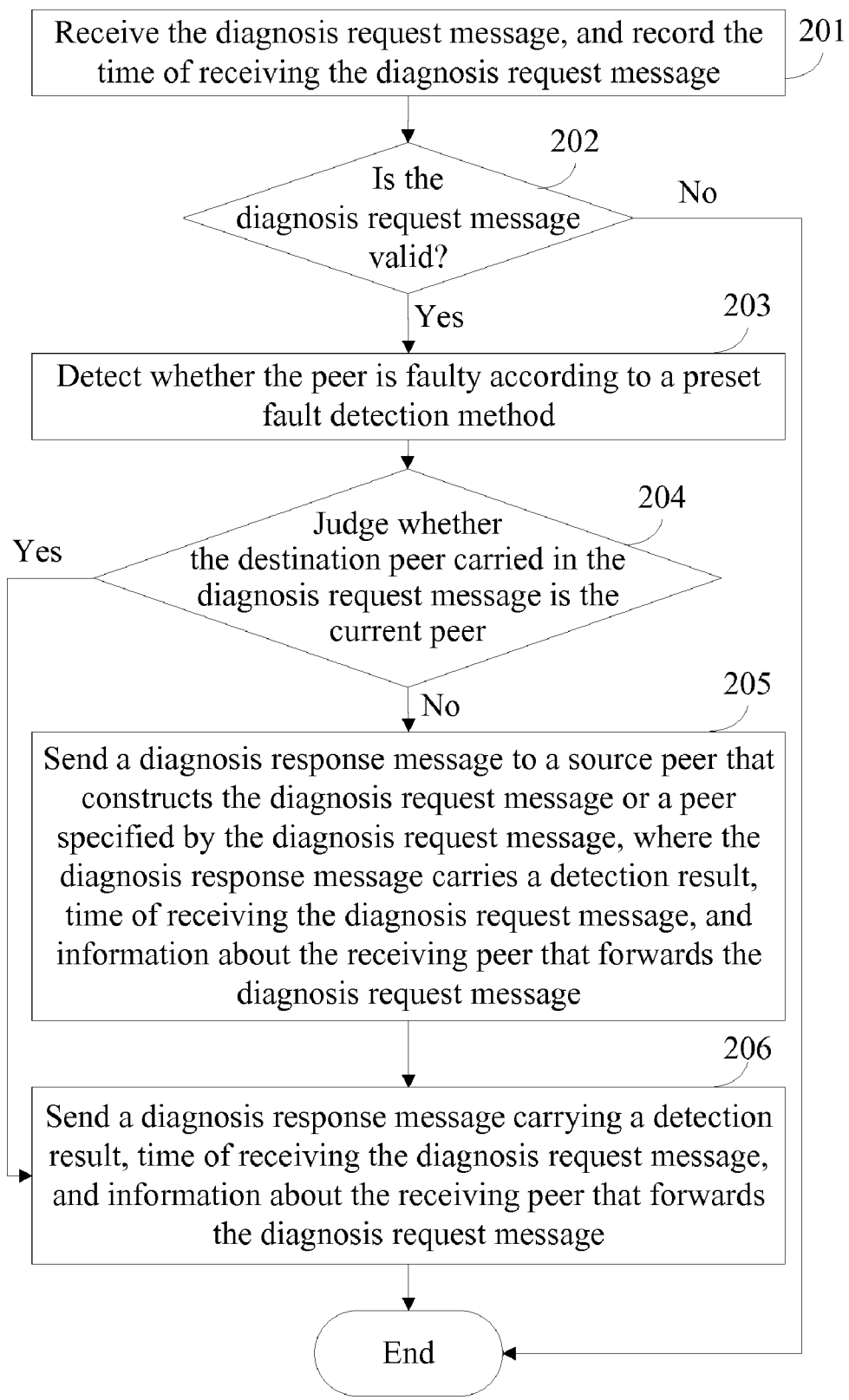
FIG. 2 is a flowchart of a method for detecting peer faults in a second embodiment of the present invention.

FIG. 2 is a flowchart of a method for detecting peer faults in the second embodiment of the present invention. The method includes the following steps:

Step 201: Receive the diagnosis request message, and record the time of receiving the diagnosis request message.

Step 202: Judge whether the diagnosis request message is valid. If the diagnosis request message is valid, proceed to step 203; otherwise, end the process.

Step 203: Detect whether the peer is faulty according to a preset fault detection rule.

Step 204: Judge whether the destination peer carried in the diagnosis request message is a current peer; if such is the case, skip to step 206; otherwise, proceed to step 205.

If the current peer is the destination peer, it is not necessary to forward the diagnosis request message, and a diagnosis response message is sent directly after the fault state of the current peer is detected, thus completing the diagnosis for the whole forwarding path.

Step 205: Forward the diagnosis request message to the downstream peer closer to the destination peer or to the destination peer.

Before the diagnosis request message is forwarded, the routing table may be searched for the downstream peer closer to the destination peer, namely, the next hop, and the diagnosis request message is forwarded to the found downstream peer; if the downstream peer is the destination peer, the diagnosis request message is sent to the destination peer directly.

Step 206: Send a diagnosis response message to a source peer that constructs the diagnosis request message or a peer specified by the diagnosis request message, where the diagnosis response message carries a detection result, time of receiving the diagnosis request message, and information about the receiving peer that forwards the diagnosis request message.

In the process of forwarding the diagnosis request message to the downstream peer closer to the destination peer, the information about the receiving peer that forwards the diagnosis request message is the information about the downstream peer closer to the destination peer; in the process of forwarding the diagnosis request message to the destination peer, the information about the receiving peer that forwards the diagnosis request message is the information about the destination peer.

In this embodiment, the detection result, the time of receiving the diagnosis request message, and the information about the receiving peer that forwards the diagnosis request message are carried in the diagnosis response message. In fact, the detection result, the time of receiving the diagnosis request message, and the information about the receiving peer that forwards the diagnosis request message may be sent separately.

In this embodiment, if the current peer is not the destination peer, the diagnosis request message is forwarded to the downstream peer or the destination peer so that the diagnosis request message may approach the destination peer. Finally, all peers on the whole forwarding path are detected, and the corresponding peer such as the source peer knows the state of the whole forwarding path, which provides a basis for the path selection in the subsequent packet forwarding.

In practice, after the downstream peer or destination peer to receive the diagnosis request message is determined, the information about the downstream peer or destination peer may be sent to the corresponding peer such as the source peer so that the corresponding peer knows the peer from which the next diagnosis response message will come. Besides, if the corresponding peer sets a time limit, and no diagnosis response message is received from the downstream peer or destination peer within the time limit, it is determined that the downstream peer or destination peer is faulty, and the downstream peer or destination peer can be located according to the information about the downstream peer or destination peer. In this way, the faulty peer may be bypassed in the subsequent packet forwarding. The information about the downstream peer or destination peer may be carried in the diagnosis response message, or sent separately, or carried in other messages to be sent to the source peer that constructs the diagnosis request message or the peer specified by the diagnosis request message.

It is understandable that step 204 and step 205 may occur after step 206, but step 205 is definitely after step 204, and step 206 is definitely after step 203.

Figure 3:
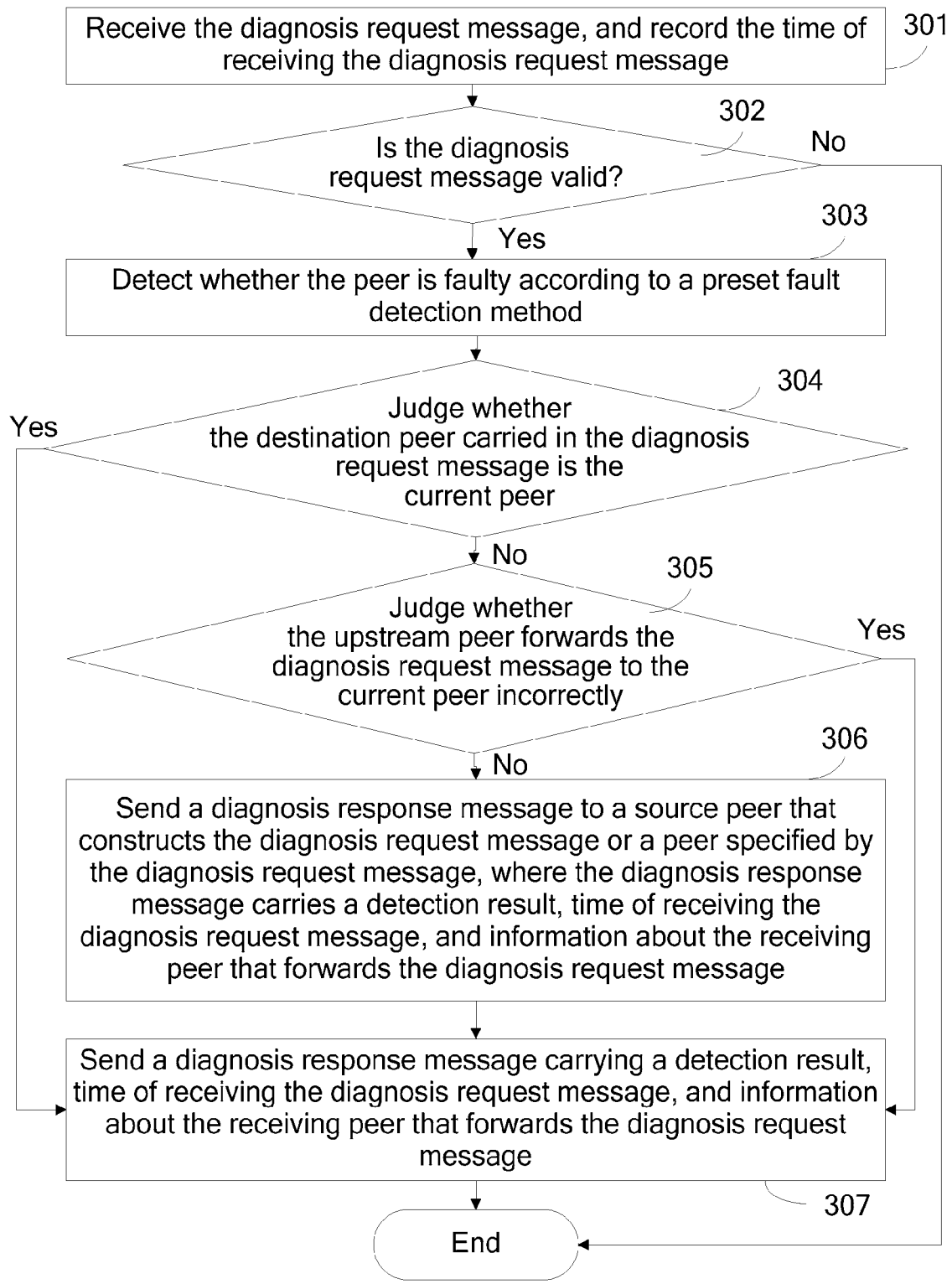
FIG. 3 is a flowchart of a method for detecting peer faults in a third embodiment of the present invention.

A method for detecting peer faults is provided in the third embodiment of the present invention. As shown in FIG. 3, the method includes the following steps:

Step 301: Receive the diagnosis request message, and record the time of receiving the diagnosis request message.

Step 302: Judge whether the diagnosis request message is valid. If the diagnosis request message is valid, proceed to step 303; otherwise, end the process.

Step 303: Detect whether the peer is faulty according to a preset fault detection rule.

Step 304: Judge whether the destination peer carried in the diagnosis request message is the current peer; if such is the case, skip to step 307; otherwise, proceed to step 305.

Step 305: Judge whether the upstream peer forwards the diagnosis request message incorrectly; if a forwarding error has occurred, proceed to step 306; otherwise, skip to step 307.

Specifically, the forwarding error of the upstream peer may be judged based on the distributed algorithm used in the P2P network, destination peer ID of the diagnosis request message, ID of the upstream peer, and the P2P network routing table of the current peer.

Step 306: Forward the diagnosis request message to the downstream peer closer to the destination peer or to the destination peer.

Step 307: Send a diagnosis response message to a source peer that constructs the diagnosis request message or a peer specified by the diagnosis request message, where the diagnosis response message carries a detection result, time of receiving the diagnosis request message, and information about the receiving peer that forwards the diagnosis request message.

In this embodiment, a judgment is made about whether the upstream peer forwards the diagnosis request message incorrectly, and the forwarding of the diagnosis request message to the downstream peer is ended if the upstream peer forwards the diagnosis request message incorrectly. Therefore, the convergence of the whole forwarding path is ensured because the forwarding by every peer on the forwarding path is consistent, namely, approaches the destination peer. In practice, even if the upstream peer forwards the diagnosis request message incorrectly, the diagnosis request message may still be forwarded to the downstream peer, especially when the information about the whole forwarding path is expected. In this case, although the diagnosis request message is further forwarded to the downstream peer, the information about the error in forwarding the diagnosis request message on the upstream peer needs to be notified to the source peer that constructs the diagnosis request message or the peer specified by the diagnosis request message. Therefore, the source peer that constructs the diagnosis request message or the peer specified by the diagnosis request message knows the fault, and can locate the faulty peer, which facilitates the troubleshooting.

It is understandable that step 304, step 305, and step 306 may occur after step 307, but step 307 is definitely after step 303 and step 306 is definitely after step 305, and step 305 is definitely after step 304.

In practice, the source peer may allow the upstream peer to reattempt forwarding of the diagnosis request message to the downstream peer after the upstream peer forwards the diagnosis request message incorrectly. In this case, after the network determines that the upstream peer forwards the diagnosis request message to the current peer incorrectly, the network needs to further judge whether the diagnosis request message carries a flag indicating that the forwarding of the diagnosis request message needs to be stopped when the upstream peer forwards the message incorrectly.

If the diagnosis request message carries a flag indicating that the forwarding of the diagnosis request message needs to be stopped when the upstream peer forwards the message incorrectly, the current peer stops forwarding the diagnosis request message to the downstream peer; if the diagnosis request message carries a flag indicating that the diagnosis request message needs to be further forwarded when the upstream peer forwards the message incorrectly, or if the diagnosis request message carries no flag indicating that the forwarding of the diagnosis request message needs to be stopped when the upstream peer forwards the message incorrectly, the current peer goes on to forward the diagnosis request message to the downstream peer. The carried flag can be pre-appointed, and is not limited herein.

Figure 4:
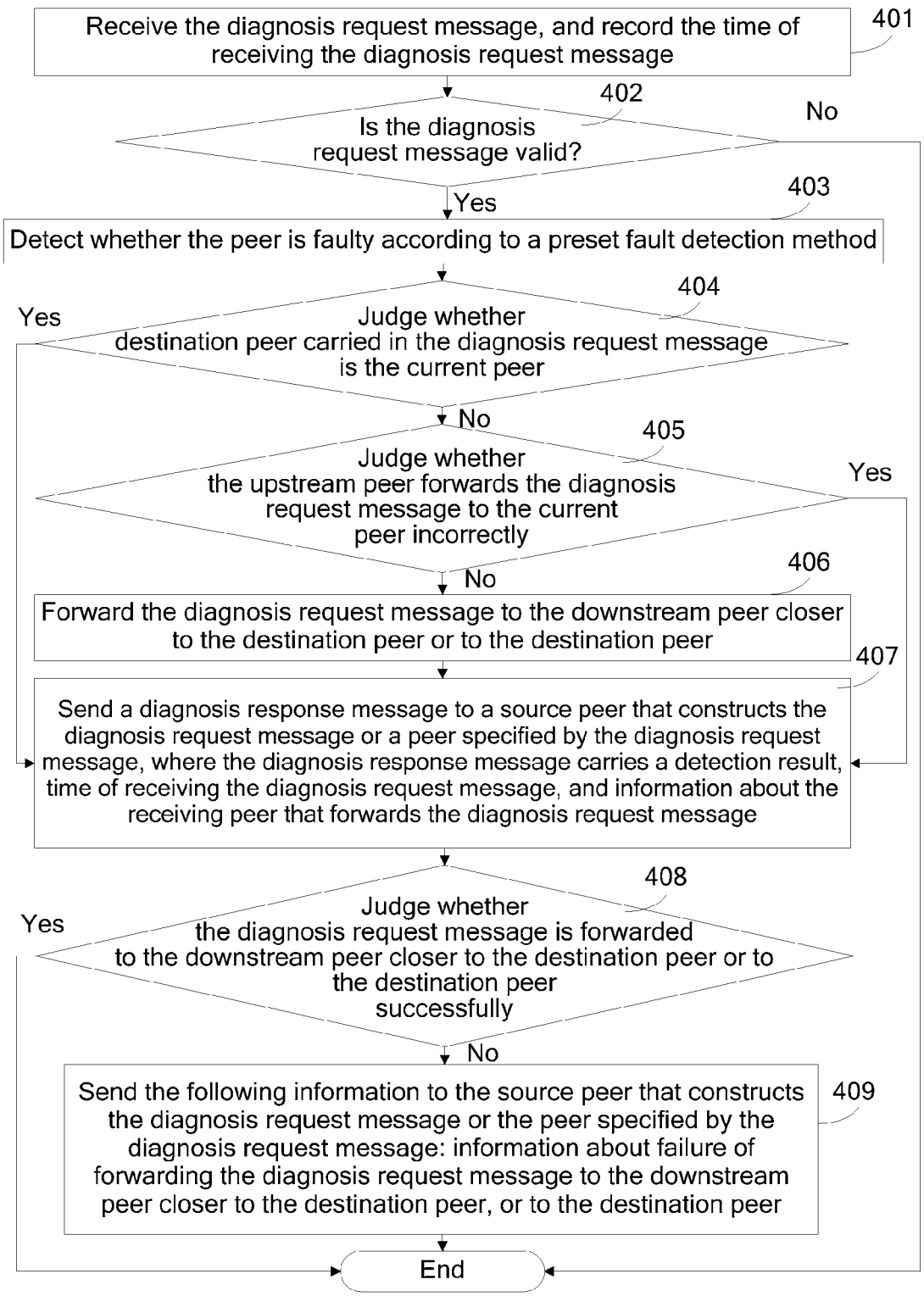
FIG. 4 is a flowchart of a method for detecting peer faults in a fourth embodiment of the present invention.

Further, in the process of forwarding the diagnosis request message to the downstream peer, it is possible that the downstream peer fails to receive the message due to network problems. In this case, in order for the source peer that constructs the diagnosis request message or the peer specified by the diagnosis request message to better locate the fault of the peer, it is necessary to judge whether the diagnosis request message is forwarded successfully after the peer forwards the message. The method for detecting the fault of the peer in the fourth embodiment of the present invention deals with this scenario. As shown in FIG. FIG. 4, the method provided in the fourth embodiment includes:

Step 401: Receive the diagnosis request message, and record the time of receiving the diagnosis request message.

Step 402: Judge whether the diagnosis request message is valid. If the diagnosis request message is valid, proceed to step 403; otherwise, end the process.

Step 403: Detect whether the peer is faulty according to a preset fault detection rule.

Step 404: Judge whether the destination peer carried in the diagnosis request message is the current peer; if such is the case, skip to step 407; otherwise, proceed to step 405.

Step 405: Judge whether the upstream peer forwards the diagnosis request message incorrectly; if a forwarding error has occurred, proceed to step 406; otherwise, skip to step 407.

Step 406: Forward the diagnosis request message to the downstream peer closer to the destination peer or to the destination peer.

Step 407: Send a diagnosis response message to a source peer that constructs the diagnosis request message or a peer specified by the diagnosis request message, where the diagnosis response message carries a detection result, time of receiving the diagnosis request message, and information about the receiving peer that forwards the diagnosis request message.

Step 408: Judge whether the diagnosis request message is forwarded to the downstream peer or destination peer successfully; if the forwarding succeeds, end the process; if the forwarding fails, proceed to step 409.

The success or failure of forwarding the diagnosis request message to the downstream peer or destination peer may be judged in many modes. For example, the diagnosis request message may require the downstream peer that receives the diagnosis request message to return a response message, and it is deemed that the message is not forwarded successfully if no response message is received. Alternatively, the success or failure of forwarding the message may be judged through a response message of the forwarding mechanism. For example, a judgment is made about whether an Internet Control Message Protocol (ICMP)-based alarm message (such as a Destination Unreachable message, or a Time Exceeded message) is received, and the forwarding is regarded as failed even if an ICMP alarm message is received. Other judgment modes may also be applied if they are appropriate.

Step 409: Send the following information to the source peer that constructs the diagnosis request message or the peer specified by the diagnosis request message: information about failure of forwarding the diagnosis request message to the downstream peer closer to the destination peer, or to the destination peer.

If it is determined that the operation of forwarding the diagnosis request message to the downstream peer or the destination peer occurs before the operation of sending the diagnosis response message, the information about failure of forwarding the diagnosis request message to the downstream peer or the destination peer may be carried in the diagnosis response message. In this embodiment, a judgment is made about whether the diagnosis request message is forwarded successfully after the diagnosis request message is forwarded. If it is determined that the forwarding fails, the failure information is sent to the source peer that constructs the diagnosis request message or the peer specified by the diagnosis request message. Therefore, the source peer that constructs the diagnosis request message or the peer specified by the diagnosis request message can obtain the information about the faulty downstream peer, and locate the faulty peer and handle the fault.

In practice, the source peer may already know the fault of a peer, and may add a flag to the diagnosis request message to indicate bypassing of the faulty peer in the forwarding process. Therefore, after determining that the diagnosis request message is forwarded unsuccessfully, the intermediate peers may further judge whether the diagnosis request message carries a flag indicating the requirement for bypassing the faulty downstream peer in the process of forwarding the diagnosis request message.

If the diagnosis request message carries a flag indicating the requirement for bypassing the faulty downstream peer, the current peer may select another downstream peer for forwarding the diagnosis request message.

Specifically, the current peer may search the routing table for a peer which is different from the faulty peer and closer to the destination peer than the current peer, and use this peer as the next downstream peer.

Bypassing the faulty downstream peer in the forwarding process makes it more possible for the diagnosis request message to reach the destination peer.

Further, in practice, after the peer receives the diagnosis request message, the peer may judge whether the destination peer is reachable according to the existing information about the current peer. If the destination peer is not reachable, the peer sends the information about non-reachability of the destination peer directly to the source peer that constructs the diagnosis request message or the peer specified by the diagnosis request message, thus improving the efficiency of path diagnosis. Specifically, the reachability of the destination peer may be detected via a protocol. For example, a Peer-to-Peer Session Initiation Protocol-Peer (P2P SIP-Peer) protocol may be used to detect looping of the diagnosis request message.

Figure 5:
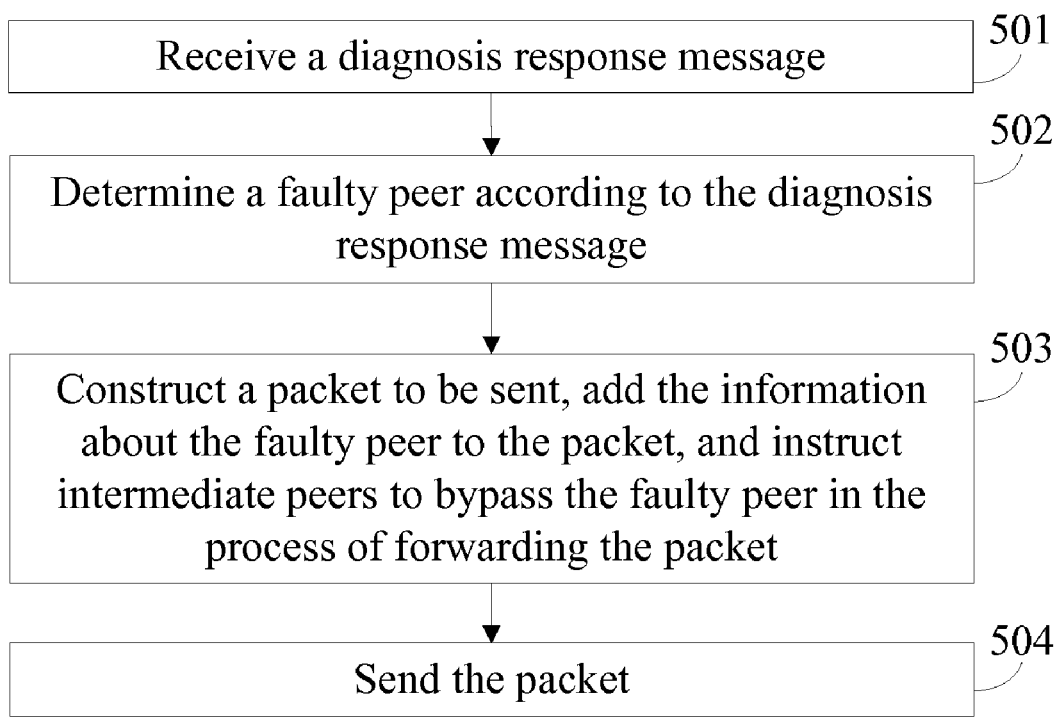
FIG. 5 is a flowchart of a method for handling peer faults in an embodiment of the present invention.

A method for handling peer faults is provided in an embodiment of the present invention. As shown in FIG. 5, the method includes:

Step 501: Receive a diagnosis response message.

Step 502: Determine a faulty peer according to the diagnosis response message.

If it is determined that the peer is faulty, the diagnosis response message carries information about the faulty peer. Therefore, the faulty peer can be determined according to the information about the faulty peer in the diagnosis response message.

Step 503: Construct a packet to be sent, add the information about the faulty peer to the packet, and instruct intermediate peers to bypass the faulty peer in the process of forwarding the packet. In order for the packet to arrive at the destination peer, the information about the faulty peer may be inserted into the preset field of the packet. The preset field may be a definite Exclude Routing Object (XRO) field. Therefore, before the downstream peer forwards the packet, the current peer may judge whether the downstream peer is the faulty peer, namely, the peer specified by the XRO. If the downstream peer is the faulty peer, the current peer selects another downstream peer for forwarding the packet. Alternatively, according to the default rule, the current peer lets the downstream peer forward the packet first, and then judges whether the downstream peer is the faulty peer when determining that the forwarding fails; and, if the downstream peer is the faulty peer, the current peer selects another downstream peer for forwarding the packet. Other modes may also be applied if they are appropriate. The embodiments of the present invention do not limit the mode applied.

Step 504: Send the packet.

In this embodiment, after the diagnosis response message is received, if the diagnosis response message carries information about the faulty peer, the information about the faulty peer is inserted into the preset field of the packet at the time of constructing the packet. Therefore, the downstream peer can bypass the faulty peer at the time of forwarding the packet; the packet can arrive at the destination peer finally; and the success ratio of forwarding the packet is increased. The foregoing operations may be partially or wholly triggered by the corresponding information inserted into the corresponding field of the diagnosis request message when the source peer constructs the diagnosis request message, where the diagnosis request message may be an existing message, or a newly constructed message. Currently, the Internet Engineering Task Force (IETF) is developing and standardizing the P2P SIP-Peer protocol. This protocol is designed to create and maintain the P2P SIP Overlay topology, and intended to provide P2P overlay services such as distributed storage and distributed forwarding. This protocol provides P2P overlay services for all the applications that are based on the P2P overlay in the P2P SIP architecture. An embodiment of this protocol is that one message corresponds to a request and a response. A message is composed of a message header and multiple objects. Each object is composed of one object header and multiple sub-objects. All objects and sub-objects are in the Type-Length-Value (TLV) format.

In an embodiment of the present invention, the P2P SIP Peer protocol is extended to provide the diagnosis message for fault detection (namely, an Echo message). This message carries an Echo object to indicate the processing rule information specified by the diagnosis source. Table 1 shows an Echo object header format in this embodiment:

TABLE 1

Echo object header information in P2P SIP Peer protocol

| Object Type | M | U | P | Reserved | Length | |
|---|---|---|---|---|---|---|
| Forward Mode | | Reply Mode | | Reply Rule | | Underlay TTL |

In the foregoing table, the Object Type field uses an extended definition to indicate that the object type is an Echo object; this field occupies 8 bits.

If the M flag value is 1, this object must be identified and processed by all the peers that support the P2P SIP Peer protocol on the P2P network; for the Echo object, this value is 1; this flag occupies 1 bit.

If the U flag value is 1, the diagnosis source requires that the response message should carry its upstream peer information; if the value is 0, the response message does not need to carry its upstream peer information; this flag occupies 1 bit.

If the P flag value is 1, the diagnosis source requires that the response peer should forward the detection message even if detecting a forwarding error of the upstream peer; if the value is 0, the response peer needs to stop forwarding if detecting a forwarding error of the upstream peer; this flag occupies 1 bit.

The Reserved field is a reserved value, and is all 0s for the Echo object; this field occupies 5 bits.

The Length field occupies 16 bits, and indicates the length of the whole Echo object measured in bytes, and includes an object header and all sub-objects.

The Forward mode field occupies 8 bits, and indicates the forwarding mode of the intermediate peer; if the value is 0, the intermediate peer itself decides the forwarding mode; if the value is 1, the forwarding mode is the recursive mode; if the value is 2, the forwarding mode is the iterative mode; if the value is 3, the recursive mode is preferred as the forwarding mode; if the value is 4, the iterative mode is preferred as the forwarding mode.

The Reply mode field occupies 8 bits, and indicates the sending mode of the diagnosis response message of the downstream peer; if the value is 0, the downstream peer itself decides the sending mode; if the value is 1, the response message is transmitted over IP directly; if the value is 2, the response message is transmitted over Overlay.

The Reply rule field occupies 8 bits, and indicates the diagnosis response rule of the downstream peer; if the value is 0, no response is required; if the value is 1, the intermediate peers do not need to make any response; if the value is 2, every peer on the forwarding path needs to make a response.

The Underlay TTL field occupies 8 bits, and indicates the TTL value used at the IP layer when the downstream peer forwards the diagnosis request message.

In practice, the Echo object may include the following sub-objects:

(1) a sub-object that represents the time of the diagnosis source sending the diagnosis request message; (2) a sub-object that represents the time of the downstream peer receiving the diagnosis request message; (3) a sub-object that represents the TTL of the diagnosis request message; and (4) a sub-object that represents the validity period of the diagnosis request message.

After constructing the foregoing Echo object, the source peer sends the Echo object to the downstream peer. After receiving the diagnosis request message, the downstream peer checks whether the time of receiving the diagnosis request message is out of the validity period of the diagnosis request message; if the time of receiving is out of the validity period, the downstream peer discards the diagnosis request message directly; otherwise, the downstream peer uses the diagnosis request message TTL specified by the diagnosis source plus the time of receiving the diagnosis request message as a new validity period of the diagnosis request message, and forwards the diagnosis request message to the downstream peer, thus suppressing the invalid diagnosis request messages on the P2P network.

Any peer on the P2P SIP Overlay can use an Echo message to diagnose the fault that possibly exists on the specified path of the P2P SIP Overlay, for example, detect and locate peer failure, peer congestion, and peer forwarding error.

Specifically, the diagnosis source peer constructs a P2P SIP Echo request message. The destination ID of this message is the specified peer-ID or resource-ID. The source ID is its own peer-ID. In this request message, the Reply Rule of the Echo object is set to 2; the Forward mode is set to 1 or 3, and the Reply mode is decided by the peer itself Before the Echo request message arrives at the destination, the intermediate peers forward the message to the downstream peer of the P2P network, and then send the Echo response message to the source peer. Finally, the destination peer returns an Echo response message.

Figure 6:
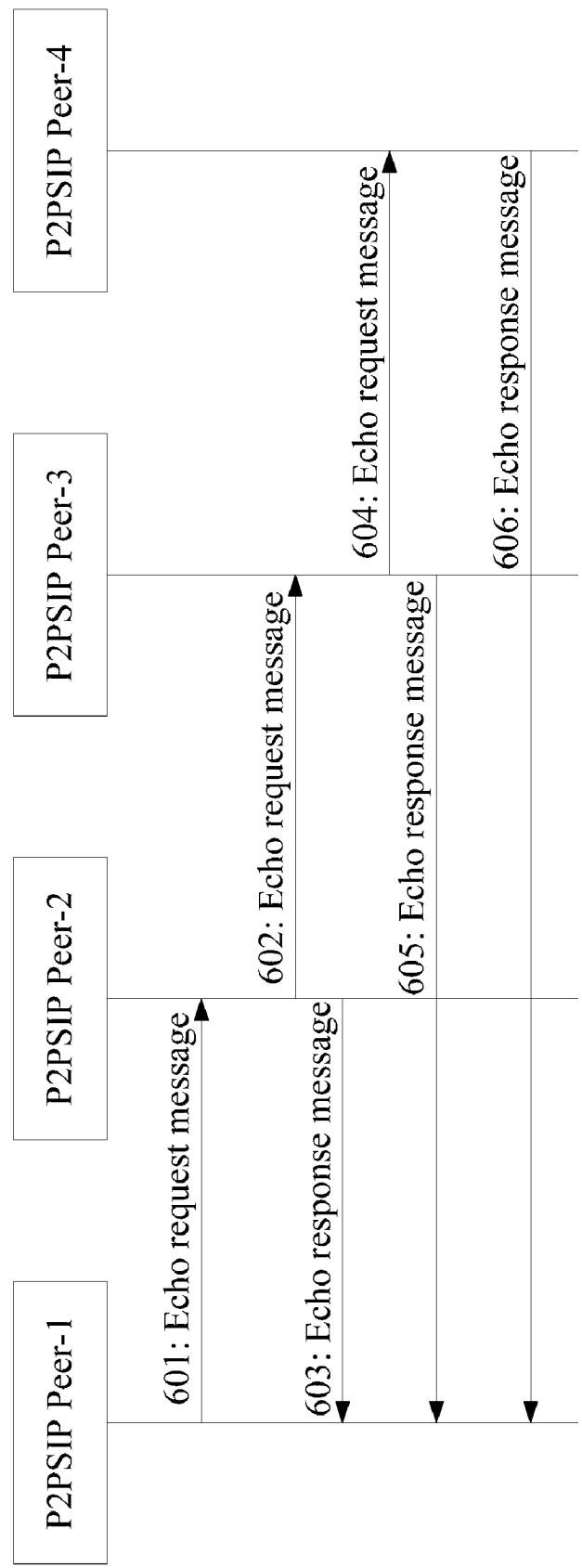
FIG. 6 is a flowchart of a method for detecting peer faults in a fifth embodiment of the present invention.

A method for detecting peer faults by using the Echo message is provided in the fifth embodiment of the present invention. As shown in FIG. 6, the method includes the following steps:

Step 601: The source peer P2P SIP Peer-1 constructs and sends an Echo request message to diagnose the fault on the forwarding path of the P2P network, where the Echo request message is destined for the P2P SIP Peer-4.

Step 602: After receiving the Echo request message from the P2P SIP Peer-1, the P2P SIP Peer-2 discovers that the P2P SIP Peer-2 itself is not the destination peer, and therefore, forwards the Echo request message further on the P2P network.

Step 603: The P2P SIP Peer-2 sends an Echo response message to the diagnosis source P2P SIP Peer-1. The Echo response message indicates the local diagnosis result and diagnosis information, and carries the information about the downstream peer P2P SIP Peer-3 that forwards the message, and this information is the peer-ID of the P2P SIP Peer-3.

Step 604: After receiving the Echo request message from the upstream P2P SIP Peer-2, the P2P SIP Peer-3 discovers that the P2P SIP Peer-3 itself is not the destination peer, and therefore, forwards the Echo request message further on the P2P network.

Step 605: The P2P SIP Peer-3 sends an Echo response message to the diagnosis source P2P SIP Peer-1. The Echo response message indicates the local diagnosis result and diagnosis information, and carries the information about the downstream peer P2P SIP Peer-4 that forwards the message.

Step 606: After receiving the Echo request message from the upstream P2P SIP Peer-3, the P2P SIP Peer-4 finds that the P2P SIP Peer-4 itself is the destination peer, and therefore, stops forwarding the Echo request message but terminates the Echo request message, and sends an Echo response message which indicates its local diagnosis result and diagnosis information to the diagnosis source P2P SIP Peer-1.

In this embodiment, the P2P SIP Peer-2, P2P SIP Peer-3, and P2P SIP Peer-4 perform the corresponding operations as required by the Echo request message. Through this embodiment, the faults of the peers are detected on the forwarding path from the P2P SIP Peer-1 to the P2P SIP Peer-4. It is understandable that FIG. 6 gives only an exemplary mode of implementing the present invention. In practice, step 603 may occur before step 602, and step 605 may occur before step 604.

Figure 7:
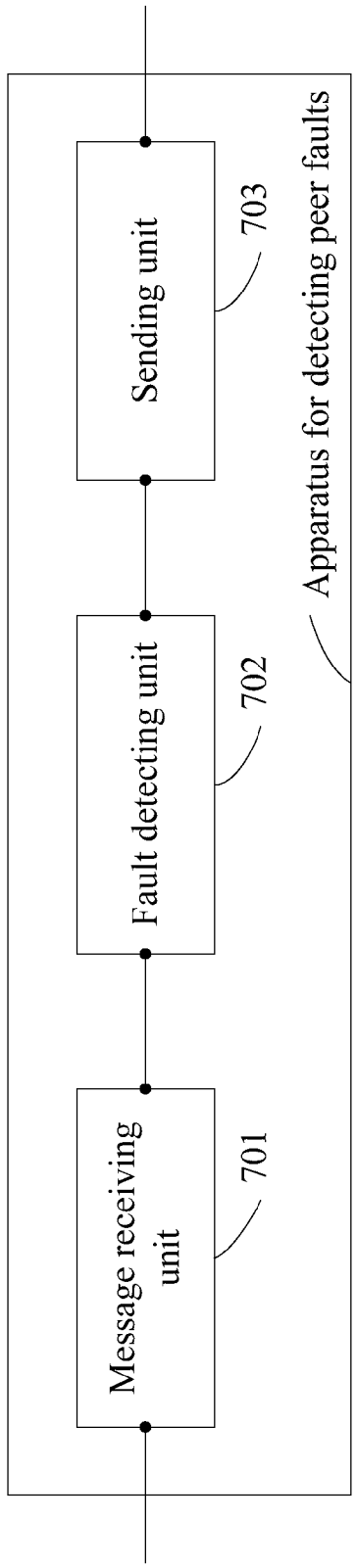
FIG. 7 shows a structure of an apparatus for detecting peer faults in the first embodiment of the present invention.

Corresponding to the method for detecting peer faults, an apparatus for detecting peer faults is provided in an embodiment of the present invention. As shown in FIG. 7, the apparatus includes:

a message receiving unit 701, adapted to receive a diagnosis request message;

a fault detecting unit 702, adapted to check whether the peer is faulty according to a preset fault detection rule; and a sending unit 703, adapted to send a diagnosis response message to a source peer that constructs the diagnosis request message or a peer specified by the diagnosis request message, where: the diagnosis response message carries a detection result, and the detection result carries information about the faulty peer if the peer is detected as faulty.

Therefore, in this embodiment, a diagnosis request message triggers the peer to detect the fault state of this peer, thus providing a fault detection mechanism for the P2P network; after detecting a fault, the peer sends the detection result to the source peer that constructs the diagnosis request message or the peer specified by the diagnosis request message. Therefore, the source peer that constructs the diagnosis request message or the peer specified by the diagnosis request message knows whether the forwarding path is smooth and decides whether to send the packet; further, the returned detection result carries information about the faulty peer, and therefore, the source peer that constructs the diagnosis request message or the peer specified by the diagnosis request message can locate the faulty peer and bypass it when sending the packet, thus improving the reliability and efficiency of data transmission in the P2P network.

Further, in order for the source peer that constructs the diagnosis request message or the peer specified by the diagnosis request message to know whether congestion or faults occur between the peers, the apparatus for detecting peer faults in this embodiment may further include:

a time recording unit, adapted to record the time of the message receiving unit receiving the diagnosis request message.

In this case, the sending unit is further adapted to send the time of the message receiving unit receiving the diagnosis request message to the source peer that constructs the diagnosis request message or the peer specified by the diagnosis request message.

Further, in order for the peer to process only valid messages, the apparatus for detecting peer faults in this embodiment may further include:

a message validity judging unit, adapted to judge whether the diagnosis request message is valid.

In this case, the fault detecting unit is adapted to detect whether the current peer is faulty according to the preset fault detection method after the fault detecting unit determines that the diagnosis request message is valid.

Figure 8:
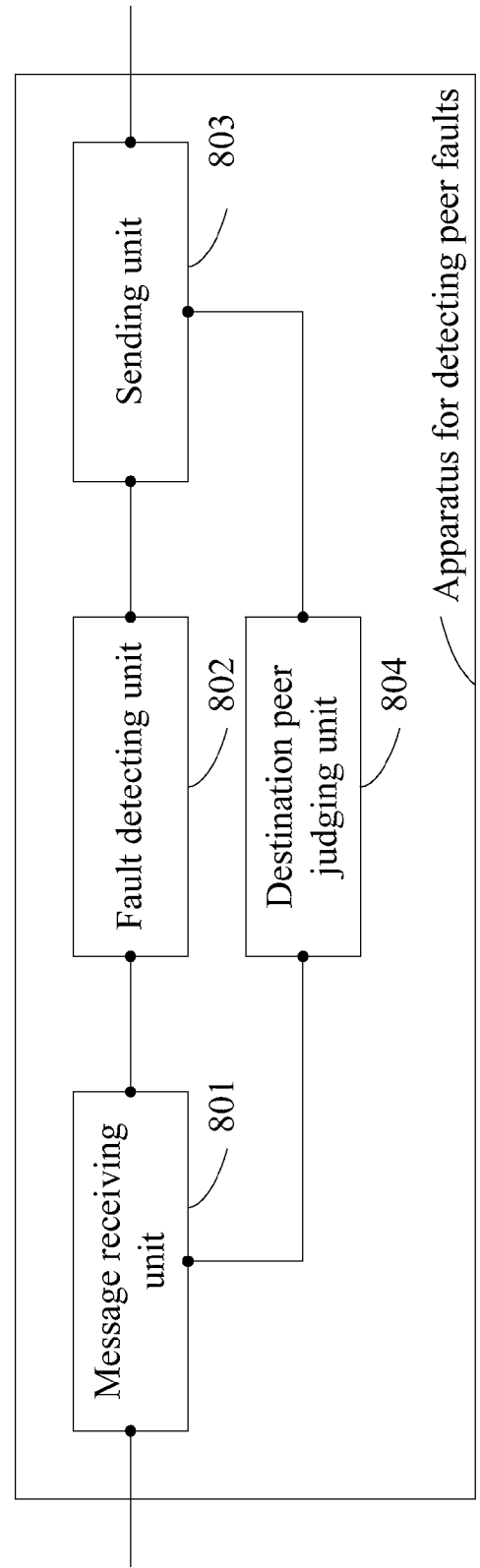
FIG. 8 shows a structure of an apparatus for detecting peer faults in the second embodiment of the present invention.

Generally, after the fault of the peer is detected, if the peer is not the destination peer, the diagnosis request message needs to be forwarded further. As shown in FIG. 8, the apparatus for detecting peer faults in the second embodiment of the present invention includes:

a message receiving unit 801, adapted to: receive the diagnosis request message, and record the time of receiving the diagnosis request message;

a fault detecting unit 802, adapted to check whether the peer is faulty according to a preset fault detection rule;

a sending unit 803, adapted to send a diagnosis response message to a source peer that constructs the diagnosis request message or a peer specified by the diagnosis request message, where: the diagnosis response message carries a detection result, and the detection result carries information about the faulty peer if the peer is detected as faulty; and a destination peer judging unit 804, adapted to judge whether the destination peer carried in the diagnosis request message is the current peer.

The sending unit 803 is also adapted to forward the diagnosis request message to the downstream peer closer to the destination peer or to the destination peer after the destination peer judging unit determines that the current peer is not the destination peer.

Figure 9:
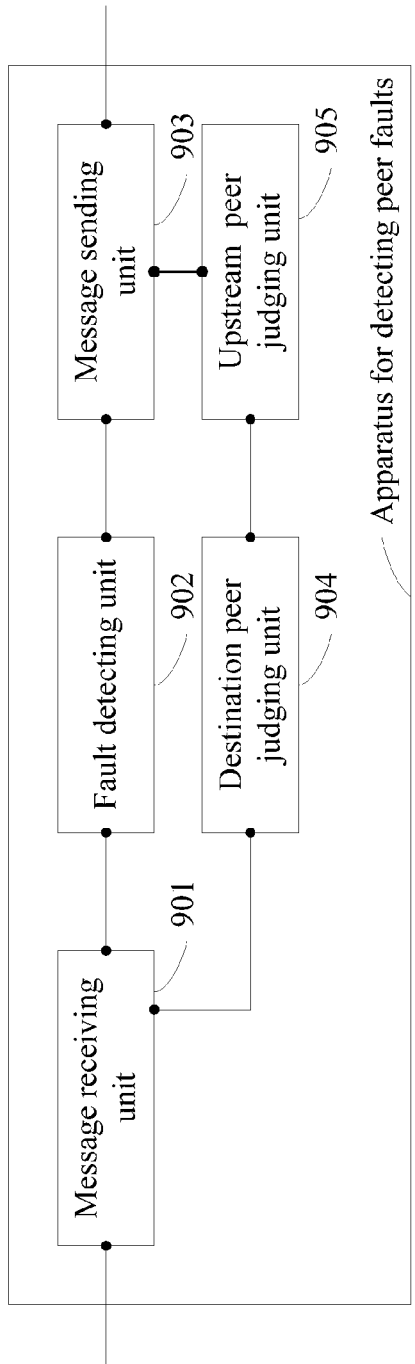
FIG. 9 shows a structure of an apparatus for detecting peer faults in the third embodiment of the present invention.

In this embodiment, if the current peer is not the destination peer, the diagnosis request message is forwarded to the downstream peer or the destination peer so that the diagnosis request message may approach or reach the destination peer. Finally, all peers on the whole forwarding path are detected, and the source peer that constructs the diagnosis request message or the peer specified by the diagnosis request message knows the state of the whole forwarding path, which provides a basis for the path selection in the subsequent packet forwarding. Further, the peer does not forward the diagnosis request message unconditionally in all circumstances. For example, when the upstream peer forwards the diagnosis request message incorrectly, the forwarding may be stopped. As shown in FIG. 9, an apparatus for detecting peer faults in the third embodiment of the present invention includes:

a message receiving unit 901, adapted to: receive the diagnosis request message, and record the time of receiving the diagnosis request message;

a fault detecting unit 902, adapted to check whether the peer is faulty according to a preset fault detection rule;

a sending unit 903, adapted to: send a diagnosis response message to a source peer that constructs the diagnosis request message or a peer specified by the diagnosis request message, where the diagnosis response message carries a detection result, and the time of receiving the diagnosis request message;

a destination peer judging unit 904, adapted to judge whether the destination peer carried in the diagnosis request message is the current peer;

an upstream peer judging unit 905, adapted to judge whether the upstream peer forwards the diagnosis request message to the current peer incorrectly before the message forwarding unit forwards the diagnosis request message to the downstream peer closer to the destination peer or to the destination peer; and a sending unit 903, adapted to forward the diagnosis request message to the downstream peer closer to the destination peer or to the destination peer after the destination peer judging unit determines that the current peer is not the destination peer and the upstream peer judging unit determines that the upstream peer forwards the diagnosis request message correctly.

In this embodiment, a judgment is made about whether the upstream peer forwards the diagnosis request message incorrectly, and the forwarding of the diagnosis request message to the downstream peer is stopped if the upstream peer forwards the diagnosis request message incorrectly. Therefore, the convergence of the whole forwarding path is ensured because the error in forwarding the diagnosis request message by the upstream peer indicates that the upstream peer is faulty or that the network path from the upstream peer to the current peer is faulty. In practice, even if the upstream peer forwards the diagnosis request incorrectly, the diagnosis request message may be forwarded to the downstream peer, especially when the information about the whole forwarding path is expected. In this case, although the diagnosis request message is further forwarded to the downstream peer, the information about the error in forwarding the diagnosis request message by the upstream peer needs to be notified to the source peer that constructs the diagnosis request message or the peer specified by the diagnosis request message. Therefore, the source peer that constructs the diagnosis request message or the peer specified by the diagnosis request message knows the fault, and can locate the faulty peer, which facilitates the troubleshooting.

Further, the source peer may require further forwarding of the diagnosis request message after the upstream peer forwards the message incorrectly. In this case, the diagnosis request message carries the corresponding information. The apparatus for detecting peer faults in this embodiment may further include:

a forwarding judging unit, adapted to judge whether the diagnosis request message carries a flag after the upstream peer judging unit determines that the upstream peer forwards the diagnosis request message to the current peer incorrectly, where the flag requires stop of forwarding the diagnosis request message when the upstream peer forwards the message incorrectly; and a message forwarding unit, adapted to forward the diagnosis request message to the downstream peer closer to the destination peer or to the destination peer after the destination peer judging unit determines that the current peer is not the destination peer, and the upstream peer judging unit determines that the upstream peer forwards the diagnosis request message correctly, and the forwarding judging unit determines that the diagnosis request message carries no flag which requires stop of forwarding the diagnosis request message when the upstream peer forwards the message incorrectly.

Likewise, the current peer may stop forwarding the message if determining that the destination peer is unreachable. Therefore, an apparatus for detecting peer faults in this embodiment may further include:

a destination peer reachability judging unit, adapted to judge whether the destination peer is reachable before the message forwarding unit forwards the diagnosis request message to the downstream peer closer to the destination peer or to the destination peer; and a sending unit, adapted to forward the diagnosis request message to the downstream peer closer to the destination peer or to the destination peer after the destination peer reachability judging unit determines that the destination peer is reachable.

The diagnosis request message is not forwarded after it is determined that the destination peer is unreachable, thus reducing unnecessary overheads of the system.

Figure 10:
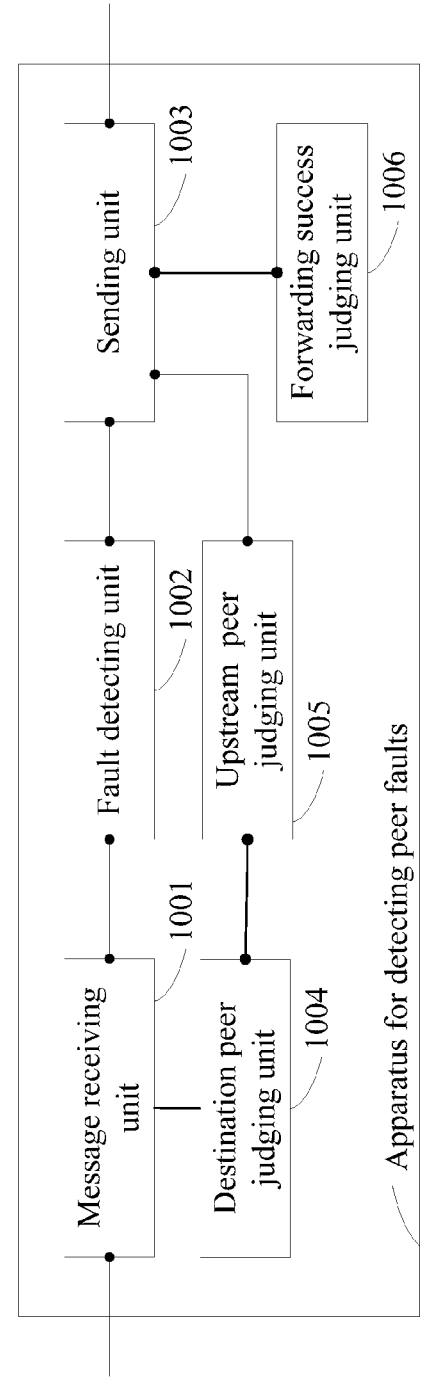
FIG. 10 shows a structure of an apparatus for detecting peer faults in the fourth embodiment of the present invention.

Further, the peer may judge success or failure of forwarding the diagnosis request message to the downstream peer. If the peer determines failure of forwarding, the peer sends information about the forwarding failure to the source peer that constructs the diagnosis request message or the peer specified by the diagnosis request message. Therefore, the source peer that constructs the diagnosis request message or the peer specified by the diagnosis request message can locate the downstream peer directly. As shown in FIG. 10, an apparatus for detecting peer faults in the fourth embodiment of the present invention includes:

a message receiving unit 1001, adapted to: receive the diagnosis request message, and record the time of receiving the diagnosis request message;

a fault detecting unit 1002, adapted to check whether the peer is faulty according to a preset fault detection rule;

a sending unit 1003, adapted to send a diagnosis response message, where the diagnosis response message includes a detection result and time of receiving the diagnosis request message;

a destination peer judging unit 1004, adapted to judge whether the destination peer carried in the diagnosis request message is the current peer;

an upstream peer judging unit 1005, adapted to judge whether the upstream peer forwards the diagnosis request message to the current peer incorrectly after the destination peer judging unit determines that the destination peer carried in the diagnosis request message is not the current peer;

a sending unit 1003, adapted to forward the diagnosis request message to the downstream peer closer to the destination peer or to the destination peer after the destination peer judging unit determines that the current peer is not the destination peer and the upstream peer judging unit determines that the upstream peer forwards the diagnosis request message correctly; and a forwarding success judging unit 1007, adapted to judge whether the message forwarding unit forwards the diagnosis request message to the downstream peer closer to the destination peer or to the destination peer successfully after the message forwarding unit performs the forwarding.

The sending unit 1003 is also adapted to send the following information to the source peer that constructs the diagnosis request message request or the peer specified by the diagnosis request message after the forwarding success judging unit determines that the diagnosis request message is forwarded to the downstream peer or the destination peer unsuccessfully: information about failure of forwarding the diagnosis request message to the downstream peer or the destination peer.

In this embodiment, a judgment is made about whether the diagnosis request message is forwarded successfully after the diagnosis request message is forwarded. If it is determined that the forwarding fails, the failure information is sent to the source peer that constructs the diagnosis request message or the peer specified by the diagnosis request message. Therefore, the source peer that constructs the diagnosis request message or the peer specified by the diagnosis request message can obtain the information about the faulty downstream peer, and locate the faulty peer.

Further, in order for the diagnosis request message to arrive at the destination peer ultimately, the apparatus for detecting peer faults in this embodiment may further include:

a selecting unit, adapted to: judge whether the diagnosis request message sets a requirement for bypassing the downstream peer in the process of forwarding the diagnosis request message after the forwarding success judging unit determines that the diagnosis request message is forwarded to the downstream peer unsuccessfully, and select another peer if such a requirement is set; and a sending unit, adapted to forward the diagnosis request message to the selected downstream peer.

The apparatus for detecting peer faults in this embodiment may be a peer in the P2P network.

Figure 11:
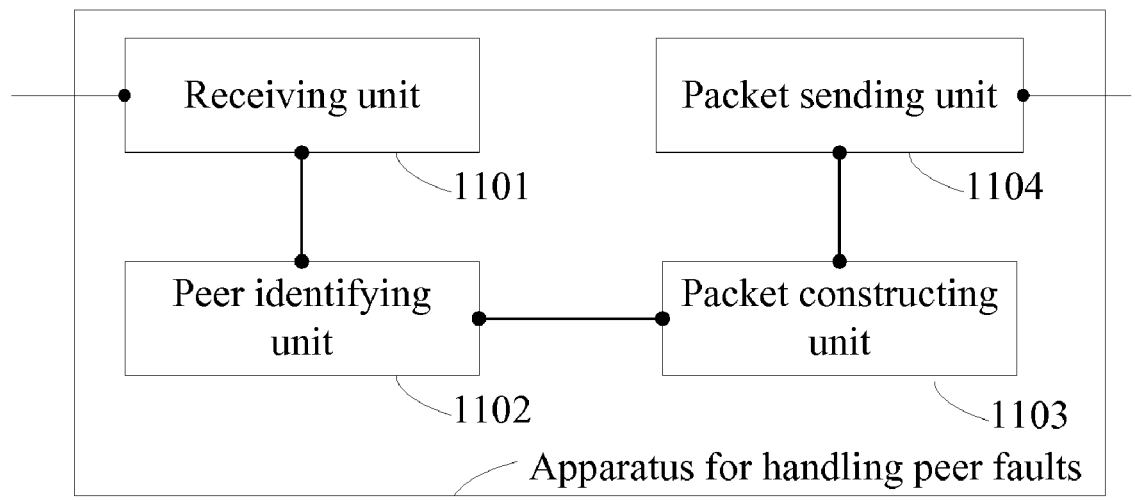
FIG. 11 shows a structure of an apparatus for handling peer faults in an embodiment of the present invention.

As shown in FIG. 11, an apparatus for handling peer faults in an embodiment of the present invention includes:

a receiving unit 1101, adapted to receive a diagnosis response message;

a peer identifying unit 1102, adapted to determine a faulty peer according to the diagnosis response message;

a packet constructing unit 1103, adapted to: construct a packet to be sent, add information about the faulty peer to the packet, and instruct intermediate peers to bypass the faulty peer in the process of forwarding the packet; and a packet sending unit 1104, adapted to send the packet.

In this embodiment, after the diagnosis response message is received, if the diagnosis response message carries information about the faulty peer, the information about the faulty peer is inserted into the preset field of the packet at the time of constructing the packet. Therefore, the downstream peer can bypass the faulty peer at the time of forwarding the packet; the packet can arrive at the destination peer finally; and the success ratio of forwarding the packet is increased. The apparatus for handling peer faults in this embodiment may serve as a source peer that initiates path diagnosis in the P2P network. In practice, the peer may serve as a source peer, or an intermediate peer, or a destination peer. Therefore, the peer in practice provides the functions of the apparatus for detecting peer faults, and the functions of the apparatus for handling peer faults. Those skilled in the art are aware that all or part of the steps of the foregoing embodiments may be implemented by hardware instructed by a program. The program may be stored in a computer-readable storage medium. When being executed, the program performs the following steps:

receiving a diagnosis request message;

detecting whether the peer is faulty according to a preset fault detection method; and sending a diagnosis response message to a source peer that constructs the diagnosis request message or a peer specified by the diagnosis request message, where: the diagnosis response message carries a detection result, and the detection result carries information about the faulty peer if the peer is detected as faulty.

The storage medium may be a Read-Only Memory (ROM), a magnetic disk, or a Compact Disk (CD).

Detailed above are a method and apparatus for detecting and handling peer faults under the present invention. Although the invention is described through several exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for detection faults of peers on a forwarding path between a source peer and a destination peer in a P2P network, comprising:
    receiving, by an intermediate peer on the forwarding path, a diagnosis request message;
    wherein the diagnosis request message is originated from the source peer for detecting faults of peers on the forwarding path between the source peer and the destination peer;
        forwarding, by the intermediate peer, the diagnosis request message to an immediate downstream peer on the forwarding path;
        judging, by the intermediate peer, that a peer upstream or downstream of the intermediate peer on the forwarding path is faulty for not providing P2P network services normally; and
        sending, by the intermediate peer, a diagnosis response message to a diagnosis collecting peer; wherein the diagnosis response message carries information about the peer judged to be faulty, and wherein the diagnosis collecting peer is the source peer or a peer specified by the diagnosis request message.

2. The method according to claim 1, wherein the step of judging comprises:
    determining whether an upstream peer of the intermediate peer has forwarded the diagnosis request message incorrectly;
    if the upstream peer has forwarded the diagnosis request message incorrectly, including in the diagnosis response message information about incorrect forwarding by the upstream peer.

3. The method according to claim 2, wherein the step of determining comprises:
    comparing an ID of the upstream peer with an ID of the destination peer;
    deciding that the upstream peer has forwarded the diagnosis request message incorrectly if the ID of the upstream peer is closer to the ID of the destination peer than an ID of the intermediate peer.

4. The method according to claim 1, the method further comprising:
    detecting that the diagnosis request message carries a stop-forwarding flag indicating that forwarding of the diagnosis request message is to be stopped if an upstream peer has forwarded the diagnosis request message incorrectly; and
    checking that the upstream peer has correctly forwarded the diagnosis request message, prior to forwarding the diagnosis request message to the immediate downstream peer.

5. The method according to claim 1, wherein the step of judging comprises:
    determining whether the forwarded diagnosis request message is received by the immediate downstream peer successfully;
    if the forwarded diagnosis request message is not received successfully by the immediate downstream peer, including in the diagnosis response message information about failure of the immediate downstream to receive the diagnosis request message.

6. The method according to claim 5, wherein the step of determining comprises:
    sending to the immediate downstream peer a receipt confirmation request requesting a receipt confirmation response from the immediate downstream peer;
    deciding that the forwarded diagnosis request message is not received successfully by the immediate downstream peer if the intermediate peer has not received the receipt confirmation response.

7. The method according to claim 5, wherein the step of determining comprises:
    checking whether an Internet Control Message Protocol (ICMP)-based alarm message regarding a failure of forwarding the diagnosis request message is received;
    deciding that the forwarded diagnosis request message is not received successfully by the immediate downstream peer if the ICMP-based alarm message is received.

8. The method according to claim 1, wherein the step of judging comprises:
    determining whether the destination peer is reachable;
    if the destination peer is not reachable, including in the diagnosis response message information about non-reachability of the destination peer.

9. The method according to claim 8, wherein the step of determining comprises:
    checking whether an ICMP-based alarm message regarding a failure of forwarding the diagnosis request message to the destination peer is received;
    deciding that the destination peer is not reachable if the ICMP-based alarm message is received.

10. An apparatus functioning as an intermediate peer on a forwarding path between a source peer and a destination peer in a P2P network, comprising a receiving circuit, a procerssor circuit, and a forwarding circuit;
    the receiving circuit, being configured to receive a diagnosis request message; wherein the diagnosis request message is originated from the source peer for detecting faults of peers on the forwarding path between the source peer and the destination peer;
    the processor, being configured to receive the diagnosis request message from the receiving circuit and trigger a forwarding circuit to forward the diagnosis request message to an immediate downstream peer on the forwarding path; further being configured to judge that a peer upstream or downstream of the intermediate peer on the forwarding path is faulty for not providing P2P network services normally, and trigger the forwarding circuit to send a diagnosis response message to a diagnosis collecting peer; wherein the diagnosis response message carries information about the peer judged to be faulty, and wherein the diagnosis collecting peer is the source peer or a peer specified by the diagnosis request message;
    the forwarding circuit, being configured to forward the diagnosis request message to the immediate downstream peer and send the diagnosis response message to the diagnosis collecting peer.

11. The apparatus according to claim 10, wherein the process is configured to determine whether an upstream peer of the intermediate peer has forwarded the diagnosis request message incorrectly; and if the upstream peer has forwarded the diagnosis request message incorrectly, include in the diagnosis response message information about incorrect forwarding by the upstream peer.

12. The apparatus according to claim 11, wherein the processor is configured to compare an ID of the upstream peer with an ID of the destination peer; and decide that the upstream peer has forwarded the diagnosis request message incorrectly if the ID of the upstream peer is closer to the ID of the destination peer than an ID of the intermediate peer.

13. The apparatus according to claim 11, wherein the processor is further configured to detect that the diagnosis request message carries a stop-forwarding flag indicating that forwarding of the diagnosis request message is to be stopped if an upstream peer has forwarded the diagnosis request message incorrectly; and check that the upstream peer has correctly forwarded the diagnosis request message, prior to triggering the forwarding circuit to forward the diagnosis request message to the immediate downstream peer.

14. The apparatus according to claim 11, wherein the processor is configured to determine whether the forwarded diagnosis request message is received by the immediate downstream peer successfully; and if the forwarded diagnosis request message is not received successfully by the immediate downstream peer, include in the diagnosis response message information about failure of the immediate downstream to receive the diagnosis request message.

15. The apparatus according to claim 14, wherein the processor is configured to send to the immediate downstream peer a receipt confirmation request requesting a receipt confirmation response from the immediate downstream peer; and decide that the forwarded diagnosis request message is not received successfully by the immediate downstream peer if the intermediate peer has not received the receipt confirmation response.

16. The apparatus according to claim 14, wherein the processor is configured to check whether an Internet Control Message Protocol (ICMP)-based alarm message regarding a failure of forwarding the diagnosis request message is received; and decide that the forwarded diagnosis request message is not received successfully by the immediate downstream peer if the ICMP-based alarm message is received.

17. The apparatus according to claim 11, wherein the processor is configured to determine whether the destination peer is reachable; and if the destination peer is not reachable, include in the diagnosis response message information about non-reachability of the destination peer.

18. The apparatus according to claim 17, wherein the processor is configured to check whether an ICMP-based alarm message regarding a failure of forwarding the diagnosis request message to the destination peer is received; and decide that the destination peer is not reachable if the ICMP-based alarm message is received.

* * * * *